United States Patent [19]
Su

[11] Patent Number: 5,886,349
[45] Date of Patent: Mar. 23, 1999

[54] AUTOMATIC MOTORCYCLE STAND HAVING A PHOTOELECTRIC SENSOR

[76] Inventor: Kuo-Hsin Su, 2F., No. 4, Lane 220, Sec. 3, Chung-Hsing Rd., Hsin-Tien City, Taipei Hsien, Taiwan

[21] Appl. No.: 895,821

[22] Filed: Jul. 17, 1997

[51] Int. Cl.$^6$ ....................................................... H01J 40/14
[52] U.S. Cl. ........................................... 250/215; 180/219
[58] Field of Search .................................... 250/206, 215, 250/214 R; 180/219; 280/301, 298

[56] References Cited

U.S. PATENT DOCUMENTS 4,651,845   3/1987   Yagasaki .................................. 180/219

*Primary Examiner*—Que T. Le
*Attorney, Agent, or Firm*—Rosenberg, Klein & Bilker

[57] ABSTRACT

An automatic motorcycle stand including a gear box fastened to a motorcycle to hold a reduction gear set, a reversible DC motor controlled by a manual switch to turn the reduction gear set, a steering gear driven by the reduction gear set to turn a rocker shaft, a rocker arm driven by the rocker shaft to move the stand of the motorcycle between the operative position and the non-operative position, two limit switches alternatively triggered by an actuating screw on the rocker shaft to stop the reversible DC motor, a photoelectric sensor mounted in the speedometer of the motorcycle and triggered to cut off power supply from the reversible DC motor upon zero reading of the speedometer, a 2P manual switch switched to turn the reversible DC motor forwards or backwards alternatively, and a 2P limit switch mounted in the ignition switch of the motorcycle to lock the 2P manual switch from being operated to move the stand to the non-operative position when the ignition switch of the motorcycle is switched off, or to unlock the 2P manual switch for permitting it to be operated when the ignition switch of the motorcycle is switched on.

1 Claim, 7 Drawing Sheets

AUTOMATIC MOTORCYCLE STAND HAVING A PHOTOELECTRIC SENSOR

BACKGROUND OF THE INVENTION

The present invention relates to motorcycle stands, and relates more particularly to an automatic motorcycle stand which uses a reversible DC motor to turn a rocker arm through a reduction gear set, a steering gear, and a rocker shaft, causing the rocker arm to move the stand of the motorcycle between the operative position and the non-operative position.

Regular motorcycles commonly have a stand pivotably connected to a stand holder at the bottom. When a motorcycle is stopped, the stand is kicked to the extended position (operative position) to support the motorcycle on the ground. It is dangerous if the motorcyclist forgets to lift up the stand to the non-operative position upon riding of the motorcycle. Furthermore, it is difficult to move the stand of a motorcycle between the operative position and the non-operative position when in a narrow area.

SUMMARY OF THE INVENTION

The present invention has been accomplished to provide an automatic motorcycle stand which can be automatically turned between the non-operative position and the operative position through the control of a manual switch. According to the present invention, the automatic motorcycle stand comprises a stand turned about a hollow pivot on a stand holder at the bottom of the frame of a motorcycle; a gear box fixedly secured to the stand holder at an outer side; a reversible DC motor mounted on the gear box and having an output shaft inserted into the gear box and a pinion fixedly secured to the output shaft; a reduction gear set revolvably mounted around a gear shaft inside the gear box and meshed with the pinion; a rocker shaft revolvably supported on bearings inside the gear box, the rocker shaft having one end inserted through the hollow pivot into a pivot hole on said stand holder, and being turned by the rocker shaft to move the stand between the operative position and the non-operative position; a rocker arm having one end fixedly secured to the rocker shaft and an opposite end connected to a side rod of the stand by a tensile spring; a steering gear fixedly mounted around the rocker shaft and meshed with the reduction gear set; a first limit switch and a second limit switch bilaterally mounted inside the gear box and alternatively triggered to stop the reversible DC motor; an actuating screw fixedly mounted on the rocker shaft and turned by it to trigger the first limit switch or the second limit switch when the stand is moved by the rocker arm to the operative position or the non-operative position; a photoelectric sensor mounted in the speedometer of the motorcycle, the photoelectric sensor being triggered to connect power to the reversible DC motor when the pointer of the speedometer is moved away from the zero reading position, or to cut off power supply from the reversible DC motor when the pointer of the speedometer is moved to the zero reading position; a 2P manual switch mounted in the handgrip of the motorcycle and manually switched between a first position in which the reversible DC motor is turned in one direction to move the stand from the non-operative position to the operative position, and a second position in which the reversible DC motor is turned in the reversed direction to move the stand from the operative position to the non-operative position; and a 2P limit switch mounted in the ignition switch of the motorcycle, the 2P limit switch being triggered to stop the 2P manual switch from being operated to move the stand to the non-operative position when the ignition switch of the motorcycle is switched off, or triggered to unlock the 2P manual switch for permitting it to be operated when the ignition switch of the motorcycle is switched on.

DETAILED DESCRIPTION OF THE PREFERRED EMBODIMENT

Figure 1:
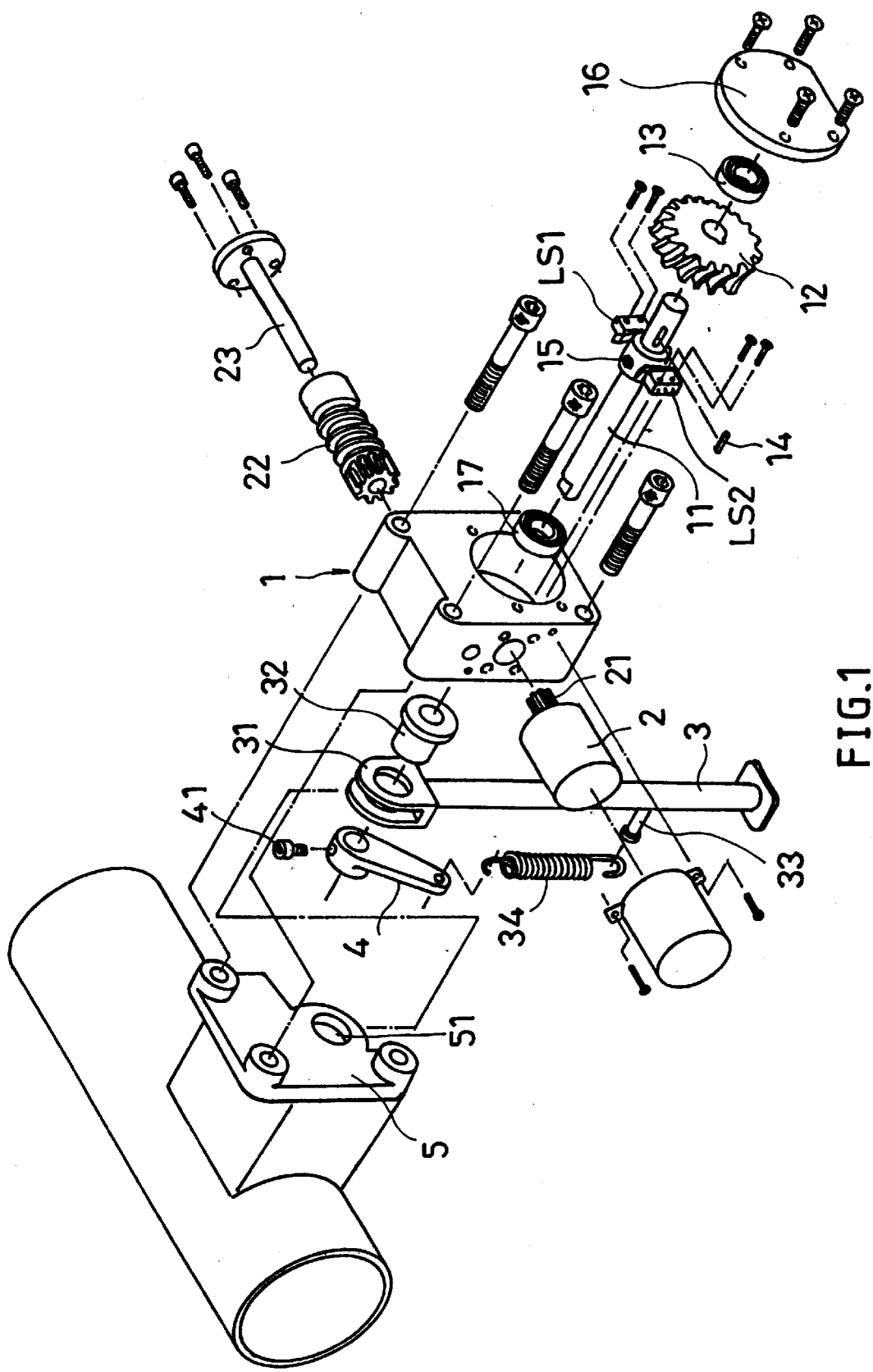
FIG. 1 is an exploded view of an automatic motorcycle stand according to the present invention.
Figure 2:
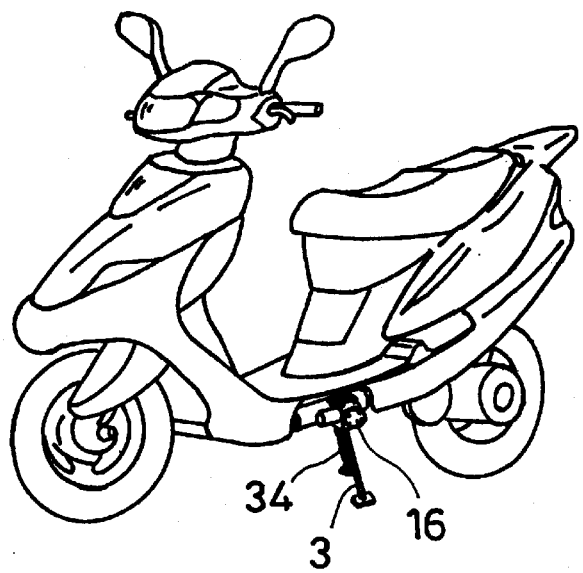
FIG. 2 shows the automatic motorcycle stand installed in a motorcycle.
Figure 3:
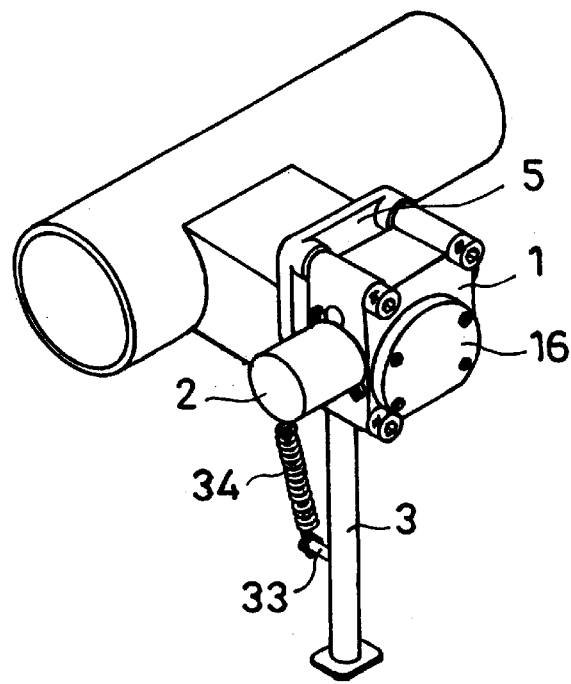
FIG. 3 is an elevation view of the automatic motorcycle stand shown in FIG. 1.
Figure 4:
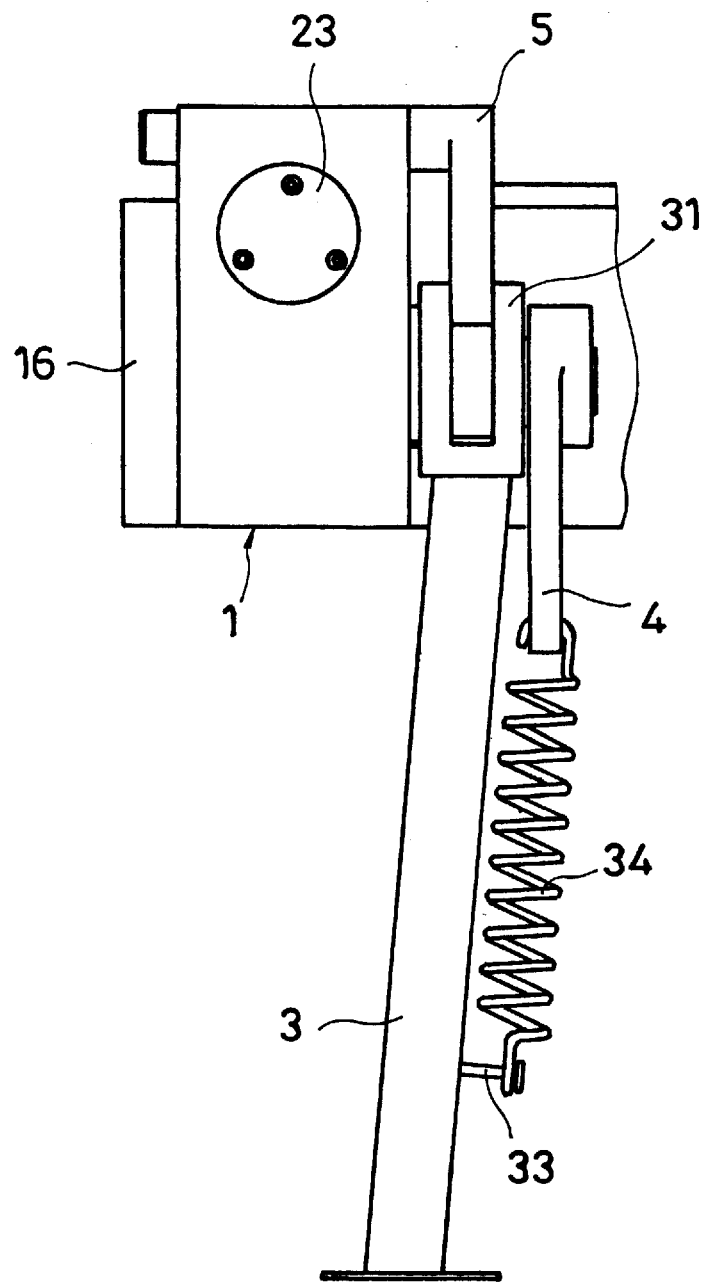
FIG. 4 is a side plain view in an enlarged scale of FIG. 3.

Referring to FIGS. 1, 2, 3, and 4, a gear box 1 is fixedly secured to the stand holder 5 of a motorcycle. A reversible DC motor 2 is mounted on the outside of the gear box 1, having a pinion 21 fixedly secured to the output end thereof and disposed inside the gear box 1. A gear shaft 23 is mounted in the gear box 1 to hold a reduction gear set 22. The reduction gear set 22 is revolvably mounted around the gear shaft 23 and meshed with the pinion 23. A rocker shaft 11 is inserted through the gear box 1, having one end supported on a bearing 13, which is fastened to the cap 16 of the gear box 1. A steering gear 12 is secured to the rocker shaft 11 adjacent to the bearing 13 by a key 14, and meshed with the reduction gear set 22. Therefore, when the reduction gear set 2 is rotated, the steering gear 12 is driven to move the rocker shaft 11.

Figure 5:
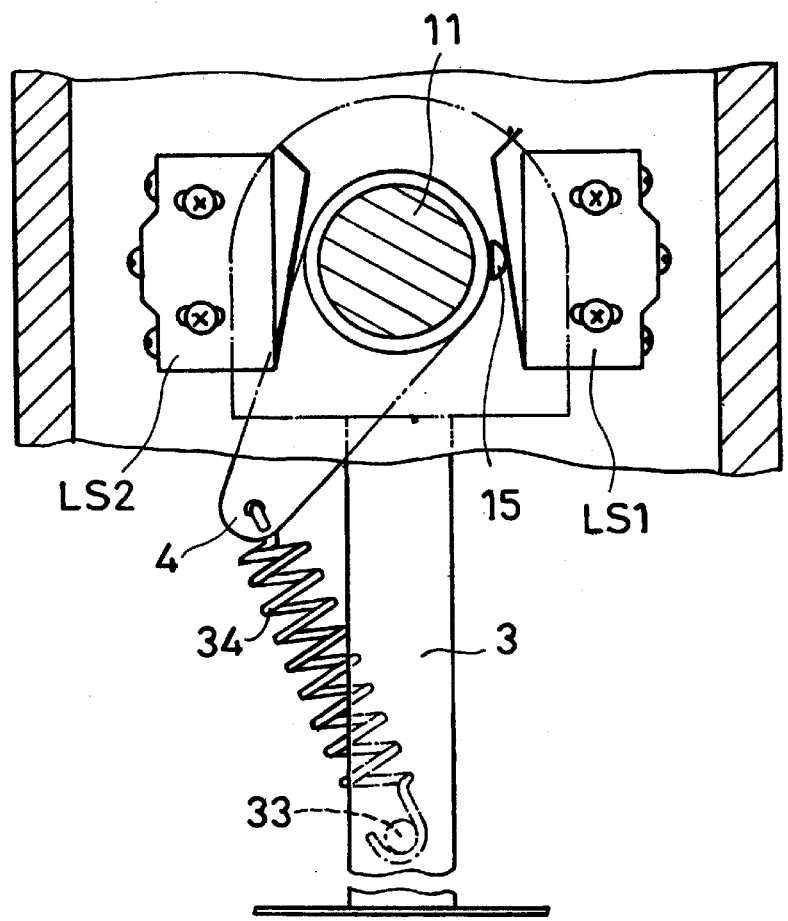
FIG. 5 is a sectional view of the automatic motorcycle stand shown in FIG. 3, showing the stand moved to the operative position, and the first limit switch triggered by the actuating screw.
Figure 6:
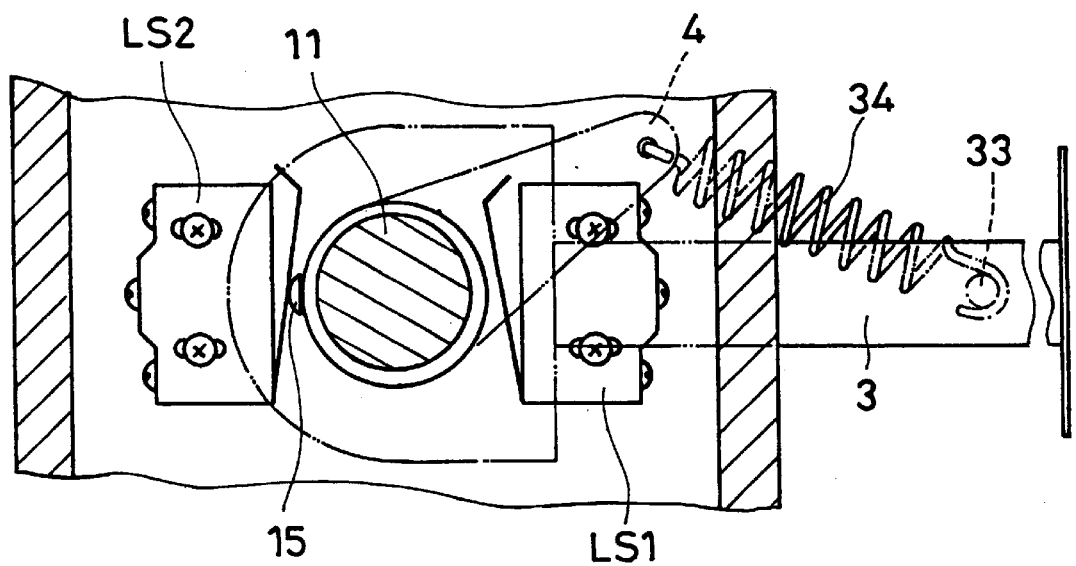
FIG. 6 is a sectional view of the automatic motorcycle stand shown in FIG. 3, showing the stand moved to the non-operative position, and the second limit switch triggered by the actuating screw.

An actuating screw 15 is fastened to the rocker shaft 11. A first limit switch LS1 and a second limit switch LS2 are bilaterally fastened to the gear box 1 on the inside. When the rocker shaft 11 is rotated by the steering gear 12, the limit switch LS1 or LS2 will be touched by the actuating screw 15, and the stand, referenced by 3, will be stopped at the operative or non-operative position. A second bearing 17 is mounted inside the gear box 1 to hold an opposite end of the rocker shaft 11. The stand holder 5 has a pivot hole 51. The stand 3 has a coupling head 31 turned about the hollow pivot 32, which is fastened to the pivot hole 51 of the stand holder 5. The rocker shaft 11 is inserted through the hollow pivot 32. A rocker arm 4 is provided having one end fixedly secured to the rocker shaft 11 by a tightening up screw 41, and an opposite end connected to a side rod 33 on the stand 3 by a tensile spring 34. Referring also to FIGS. 5 and 6, when the reversible DC motor 2 is started to turn the reduction gear set 22 through the pinion 21, the steering gear 12 is driven by the reduction gear set 22 to rotate the rocker shaft 11, thereby causing the rocker arm 4 to pull the tensile spring 34. When the tensile spring 34 is pulled by the rocker arm 4, the stand 3 will be moved extended out to the operative position or lifted up to the non-operative position. When the stand 3 is moved to the operative position or the non-operative position, the actuating screw 15 is simultaneously forced to touch the limit switch LS1 or LS2, causing it to stop the reversible DC motor 2.

Figure 7:
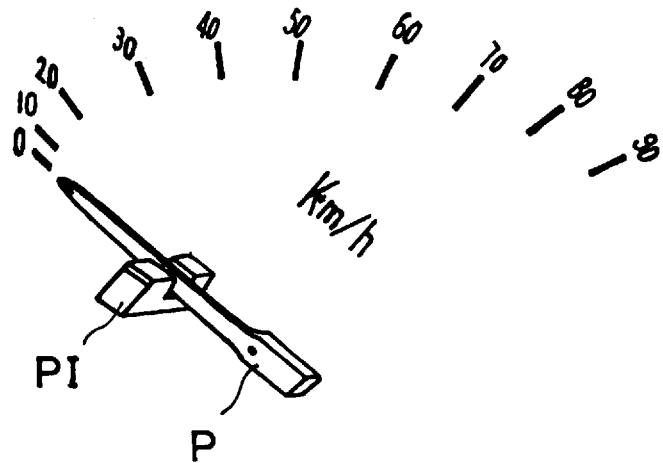
FIG. 7 shows the photoelectric sensor mounted in the speedometer of the motorcycle, and the pointer of the speedometer moved to the zero-reading position according to the present invention.
Figure 8:
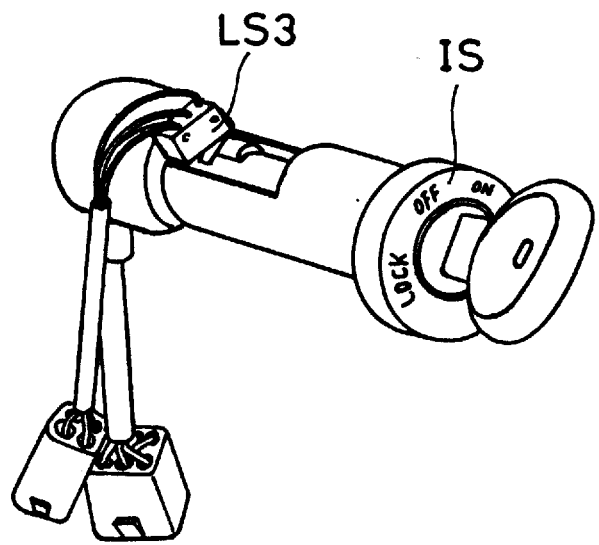
FIG. 8 shows a 2P limit switch installed in the ignition switch of the motorcycle according to the present invention.
Figure 9:
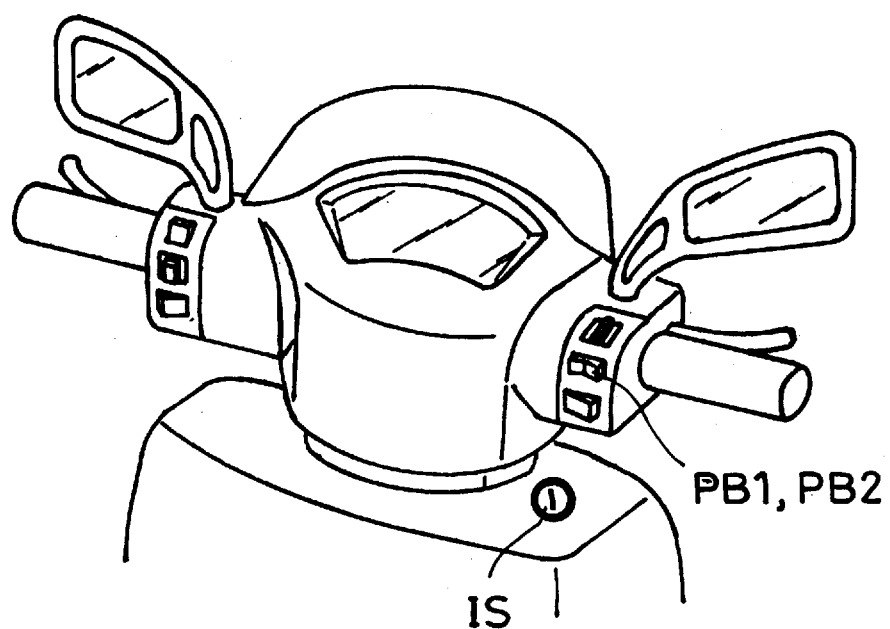
FIG. 9 shows a 2P manual. switch mounted on the handgrip of the motorcycle according to the present invention.

Referring to FIGS. 7, 8, and 9, a photoelectric sensor PI is mounted in the speedometer of the motorcycle, which is triggered when the pointer P of the speedometer is moved away from the zero-reading position. When the photoelectric sensor PI is triggered, the 2P manual switch PB1, PB2 which is mounted on the handgrip of the motorcycle is automatically shifted to the middle position. The 2P manual switch PB1, PB2 can be depressed leftwards or rightwards to extend out the stand 3 or lift it up. A 2P limit switch LS3 is mounted in the ignition switch IS of the motorcycle. When the ignition switch IS is switched on, the 2P manual switch PB1, PB2 is unlocked and becomes operative. On the contrary, when the ignition switch IS is switched off, the 2P manual switch PB1, PB2 is locked, and cannot be depressed to lift up the stand 3.

Figure 10:
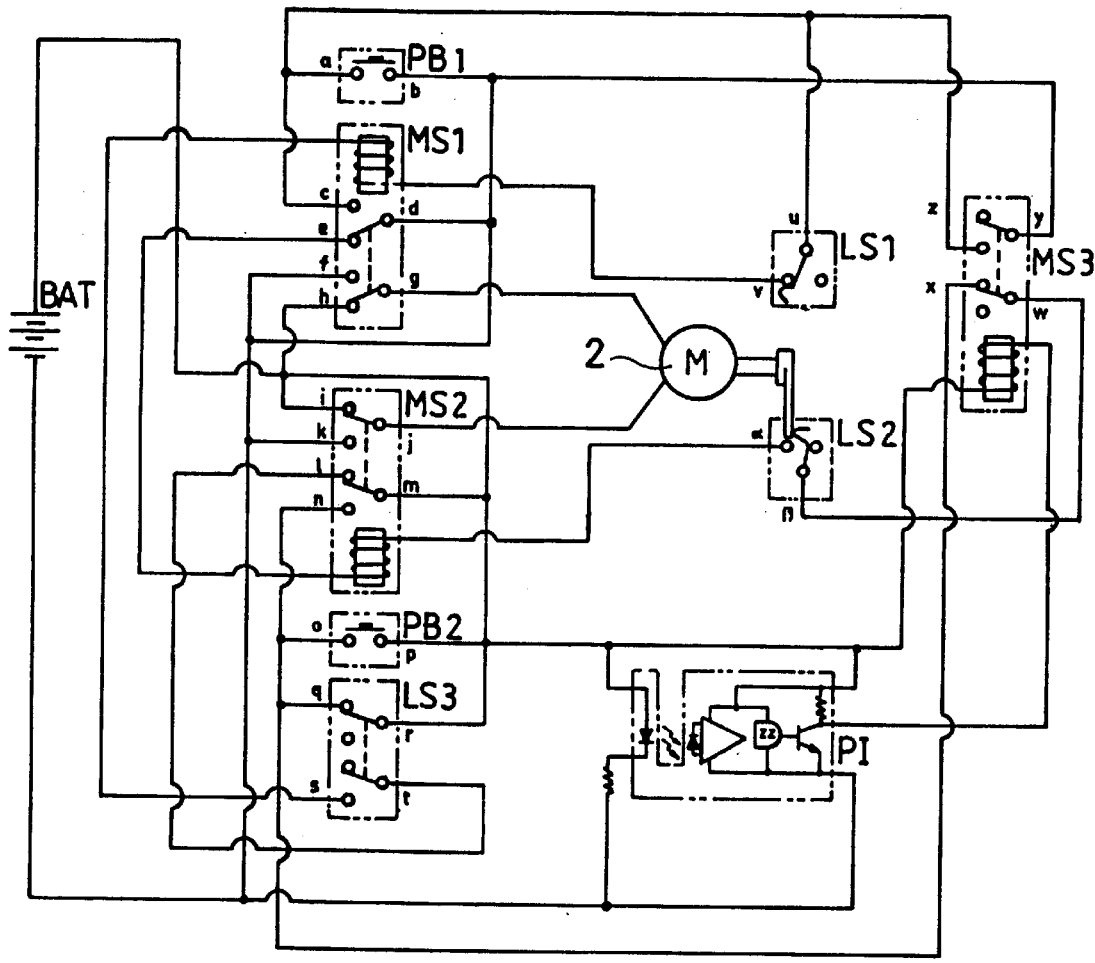
FIG. 10 is a control circuit diagram according to the present invention.

Referring to FIG. 10, when the ignition switch IS of the motorcycle is switched on, the contacts q and r of the 2P limit switch LS3 are electrically disconnected, and the contacts s and t are electrically connected. Under this condition, the 2P manual switch can be switched to PB1 to trigger a relay MS1, causing it to lift up the stand 3, and the 2P manual switch can be switched to PB2 to extend out the stand 3. When the ignition switch IS of the motorcycle is switched off, the contacts q and r of the 2P limit switch LS3 are electrically connected, the relay MS2 is triggered to let the stand 3 be moved to the operative position. Under this condition, Either the 2P manual switch is switched to PB1 or the pointer P of the speedometer is moved away from the zero-reading position, the stand 3 will not be lifted up from the operative position to the non-operative position. When the motorcycle is running, the pointer P is moved away from the zero-reading position, and the photoelectric sensor PI is triggered to electrically connect the contacts y and z of the relay MS1, causing the stand 3 lifted up from the operative position to the non-operative position fully automatically, and at the same time, the contacts w and x of the relay MS2 are electrically disconnected to stop the relay MS2 from operation, therefore the stand 3 cannot be extended out from the non-operative position to the operative position during the running of the motorcycle when the 2P manual switch is switched to PB2 or the ignition switch IS is switched off.

It is to be understood that the drawings are designed for purposes of illustration only, and are not intended as a definition of the limits and scope of the invention disclosed.

I claim:

1. An automatic motorcycle stand, comprising:

a stand turned about a hollow pivot on a stand holder at the bottom of the frame of a motorcycle;

a gear box fixedly secured to said stand holder at an outer side;

a reversible DC motor mounted on said gear box and having an output shaft inserted into said gear box and a pinion fixedly secured to said output shaft;

a reduction gear set revolvably mounted around a gear shaft inside said gear box and meshed with said pinion;

a rocker shaft revolvably supported on bearings inside said gear box, said rocker shaft having one end inserted through said hollow pivot into a pivot hole on said stand holder;

a rocker arm having one end fixedly secured to said rocker shaft and an opposite end connected to a side rod of said stand by a tensile spring, said rocker arm being turned by said rocker shaft to move said stand between the operative position and the non-operative position;

a steering gear fixedly mounted around said rocker shaft and meshed with said reduction gear set;

a first limit switch and a second limit switch bilaterally mounted inside said gear box and alternatively triggered to stop said reversible DC motor;

an actuating screw fixedly mounted on said rocker shaft and turned by it to trigger said first limit switch or said second limit switch when said stand is moved by said rocker arm to the operative position or the non-operative position, a photoelectric sensor mounted in the speedometer of the motorcycle, said photoelectric sensor being triggered to connect power to said reversible DC motor when the pointer of the speedometer is moved away from the zero reading position, or to cut off power supply from said reversible DC motor when the pointer of the speedometer is moved to the zero reading position;

a 2P manual switch mounted in the handgrip of the motorcycle and manually switched between a first position in which said reversible DC motor is turned in one direction to move said stand from the non-operative position to the operative position, and a second position in which said reversible DC motor is turned in the reversed direction to move said stand from the operative position to the non-operative position; and a 2P limit switch mounted in the ignition switch of the motorcycle, said 2P limit switch being triggered to stop said 2P manual switch from being operated to move said stand to the non-operative position when the ignition switch of the motorcycle is switched off, or triggered to unlock said 2P manual switch for permitting it to be operated when the ignition switch of the motorcycle is switched on.

* * * * *